F. STARIN.
CAGE FOR BALL BEARINGS.
APPLICATION FILED APR. 27, 1916.
1,203,928.
Patented Nov. 7, 1916.
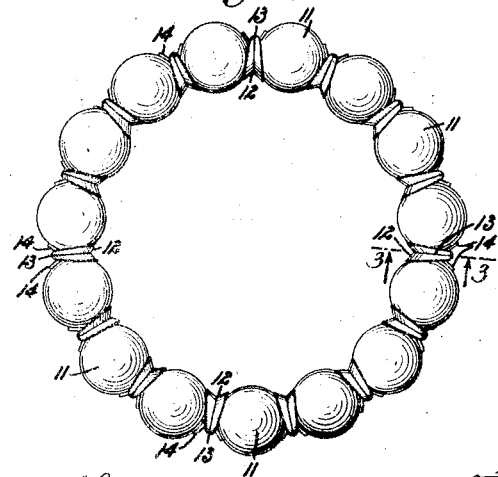
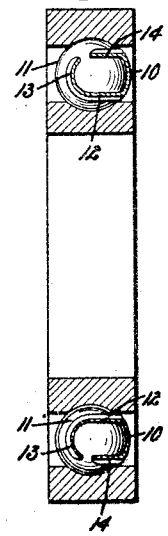
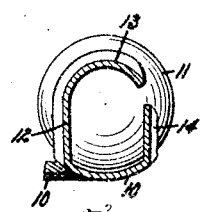
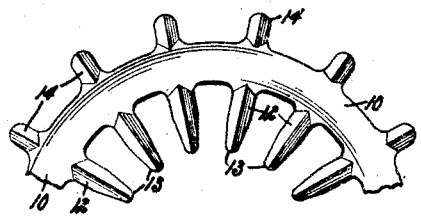
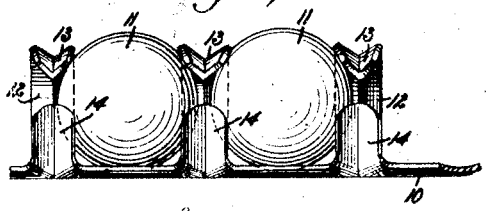
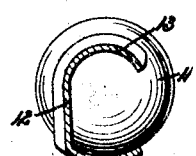
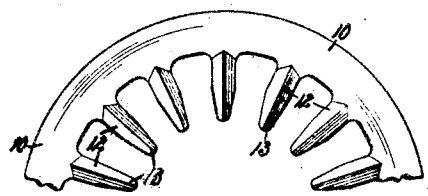
WITNESSES
INVENTOR
Frank Starin
BY
ATTORNEYS

UNITED STATES PATENT OFFICE.

FRANK STARIN, OF SPRINGFIELD, MASSACHUSETTS.

CAGE FOR BALL-BEARINGS.

1,203,928.   Specification of Letters Patent.   Patented Nov. 7, 1916.

Application filed April 27, 1916. Serial No. 93,885.

*To all whom it may concern:*

Be it known that I, FRANK STARIN, a subject of the Emperor of Austria-Hungary, and a resident of Springfield, in the county of Hampden and State of Massachusetts, have invented a new and Improved Cage for Ball-Bearings, of which the following is a full, clear, and exact description.

The object of the invention is to provide a new and improved cage for ball bearings which is simple and durable in construction, cheap to manufacture, formed of a single piece of material and arranged to securely confine the balls in position in the cage and to allow the free rotation thereof, at the same time providing inner and outer contacts with the ball race and contacts at one side of the walls to permit the use of the ball bearing as a thrust bearing.

In order to accomplish the desired result, use is made of a ring, forming on one face a seat for one side of the balls, and spaced retaining tongues approximately V-shape in cross section and extending integrally from one edge of the ring at approximately a right angle to the said ring face, each tongue having a segmental angular terminal extending opposite the said face of the ring.

A practical embodiment of the invention is represented in the accompanying drawings forming a part of this specification, in which similar characters of reference indicate corresponding parts in all the views.

Figure 1 is a face view of the cage with the balls in position therein; Fig. 2 is a cross section of the same in position in the ball race; Fig. 3 is an enlarged sectional plan view of the cage on the line 3—3 of Fig. 1 and with a ball in position in the cage; Fig. 4 is a face view of a portion of the blank for forming the cage; Fig. 5 is an enlarged plan view of a portion of the cage and with two balls in position therein; Fig. 6 is an enlarged sectional plan view of a modified form of the cage with a ball in position therein; and Fig. 7 is a face portion of the blank of the modified form of the cage shown in Fig. 6.

The cage is made from a single piece of metal and consists essentially of a flat ring 10 having one face concave to form an annular seat for the balls 11 held in place on the said concave seat by tongues 12 extending approximately at a right angle from the inner edge of the ring 10 and having a segmental terminal 13 disposed directly opposite the concave face of the ring 10. The tongue 12 and its terminal 13 is preferably made V-shaped in cross section and the terminal 13 is slightly tapering, as plainly shown in the drawings. The tongues 12 are spaced apart to confine a ball 11 between adjacent tongues thus providing seats and retaining flanges for a large number of balls in a single cage. By providing the return bent segmental terminals 13 the balls are readily confined in position on the seat 10 and the terminals 13 extend in a plane lying within the plane of the ring and the outer side of the balls 11 so that the balls have their inner and outer ends as well as one side free for engagement with ball races of ordinary bearings such as shown in Fig. 2, or thrust bearings, if used on such. If desired, additional retaining tongues 14 may be used and these retaining tongues 14 extend integrally from the outer edges of the rim 10 toward the terminals 13 of the other tongues 12 with which they are in transverse alinement. The supplementary retaining tongues 14 terminate approximately about one-half of the diameter of a ball, as plainly indicated in Figs. 2 and 3. The supplementary retaining tongues 14 are V-shaped in cross section, the same as the other tongues 12 and their terminals 13.

The cage shown and described can be readily formed up from a stamped piece of sheet metal, as shown in Figs. 4 and 7, and hence can be cheaply manufactured.

Having thus described my invention, I claim as new and desire to secure by Letters Patent:—

1. A one piece cage for ball bearings, consisting of a ring forming at one face a seat for one side of the balls, and spaced retaining tongues approximately V-shape in cross section and extending integrally from one edge of the ring at approximately a right angle to the said ring face, each tongue having a segmental angular terminal slightly tapering and extending opposite the seat face of the ring.

2. A one piece cage for ball bearings, consisting of a ring concave at one face to form a seat for the balls, and spaced retaining tongues extending integrally from the inner edge of the ring approximately at a right angle to the plane of the ring, each tongue having a tapering segmental terminal bent toward the said concave face, each tongue and its terminal being approximately V-shape in cross section, and the terminal extending in a plane lying within the plane of the ring and the outer side of the balls.

3. A one piece cage for ball bearings, consisting of a ring concave at one face to form a seat for the balls, spaced retaining tongues extending integrally from the inner edge of the ring approximately at a right angle to the plane of the ring, each tongue having a segmental terminal bent toward the said concave face, and outer retaining tongues extending integrally from the outer edge of the ring approximately at a right angle to the plane of the ring and parallel to the said first-named tongue and directly opposite the same, the said outer retaining tongues extending toward the terminals of the other tongues and spaced therefrom.

4. A one-piece cage for ball bearings, consisting of a ring concave at one face to form a seat for the balls, spaced retaining tongues extending integrally from the inner edge of the ring approximately at a right angle to the plane of the ring, each tongue having a tapering segmental terminal bent toward the said concave face, and outer retaining tongues extending integrally from the outer edge of the ring approximately at a right angle to the plane of the ring and parallel to the said first-named tongue directly opposite the same, the said outer and inner tongues being approximately V-shape in cross section and the said outer tongues extending toward the terminals of the other tongues and terminating short of the said terminals.

FRANK STARIN.